(12) United States Patent
Carrier et al.

(10) Patent No.: US 9,760,626 B2
(45) Date of Patent: Sep. 12, 2017

(54) OPTIMIZING PARSING OUTCOMES OF DOCUMENTS

(71) Applicant: International Business Machines Corporation, Armonk, NY (US)

(72) Inventors: Scott R. Carrier, Apex, NC (US); Julia A. Holloway, Raleigh, NC (US); Seamus R. McAteer, Navan (IE); Daniel J. McCloskey, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 14/477,959

(22) Filed: Sep. 5, 2014

(65) Prior Publication Data

US 2016/0070693 A1   Mar. 10, 2016

(51) Int. Cl.
*G06F 17/30* (2006.01)
*G06F 17/27* (2006.01)

(52) U.S. Cl.
CPC .... *G06F 17/30654* (2013.01); *G06F 17/2715* (2013.01); *G06F 17/2785* (2013.01)

(58) Field of Classification Search
CPC ........... G06F 17/30654; G06F 17/2785; G06F 17/2715
See application file for complete search history.

(56) References Cited

U.S. PATENT DOCUMENTS

| | | | |
|---|---|---|---|
| 5,963,742 A | 10/1999 | Williams | |
| 7,873,992 B1 | 1/2011 | Daily et al. | |
| 8,086,442 B1 | 12/2011 | Wu et al. | |
| 8,131,546 B1 | 3/2012 | Zoellner | |
| 2007/0016398 A1* | 1/2007 | Buchholz | G06F 17/2705 704/4 |
| 2009/0063150 A1 | 3/2009 | Nasukawa et al. | |
| 2009/0287678 A1 | 11/2009 | Brown et al. | |
| 2011/0066587 A1 | 3/2011 | Ferrucci et al. | |

(Continued)

OTHER PUBLICATIONS

Khoo et al., "Identifying Semantic Relations in Text for Information Retrieval and Information", 2002, Springer Netherlands, pp. 161-180.*

(Continued)

*Primary Examiner* — Alexander Khong
(74) *Attorney, Agent, or Firm* — Francis Lammes; Stephen J. Walder, Jr.; Diana R. Gerhardt

(57) ABSTRACT

A mechanism is provided for optimizing parsing of grammatical prose in a multi-prose electronic document. A received multi-prose electronic document is partitioned into a set of text segments of homogenous prose. A set of predefined Natural Language (NL) parsers is executed on each text segment in order to discern and measure a quality of parses by each NL parser throughout the multi-prose electronic document. A cross-parse analysis of the multi-prose electronic document and an aggregation of adjacent clauses or sentences of poor quality parses are performed. For each text segment, aggregation patterns yielding a best semantic role match are identified from one of the set of predefined NL parsers. Then, a parsed electronic document is generated using the set of predefined NL parsers such that each text segment is parsed by a NL parser that has the best semantic role match to that text segment.

17 Claims, 4 Drawing Sheets

(56) References Cited

U.S. PATENT DOCUMENTS

| | | | |
|---|---|---|---|
| 2011/0125734 A1 | 5/2011 | Duboue et al. | |
| 2011/0271232 A1 | 11/2011 | Crochet et al. | |
| 2012/0078612 A1* | 3/2012 | Kandekar | G06F 17/2745 704/9 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0019443 A1 | 1/2014 | Golshan | |
| 2014/0279864 A1* | 9/2014 | Lopyrev | G06F 17/30569 707/609 |
| 2015/0356260 A1* | 12/2015 | D'Souza | G06F 19/328 705/2 |

OTHER PUBLICATIONS

Fossum, Victoria et al., "Combining Constituent Parsers", Proceedings of the 2009 Conference on Empirical Methods in Natural Language Processing, vol. 3, Association for Computational Linguistics, Singapore, Aug. 6-7, 2009, 4 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Mittal, Sparsh et al., "Versatile question answering systems: seeing in synthesis", International Journal of Intelligent Information and Database Systems, vol. 5, No. 2, Mar. 2011, pp. 119-142.

Palmer, David D. et al., "Adaptive Multilingual Sentence Boundary Disambiguation", 1997 Association for Computational Linguistics, http://acl.ldc.upenn.edu/J/J97/J97-2002.pdf, retrieved Mar. 5, 2014, 28 pages.

Reynar, Jeffrey C. et al., "A Maximum Entropy Approach to Identifying Sentence Boundaries", Proceedings on the Fifth Conference on Applied Natural Language Processing (ANLP'97), Washington DC, Mar. 31-Apr. 3, 1997, pp. 16-19.

Tu, Zhaopeng et al., "Combining Multiple Alignments to Improve Machine Translation", Proceedings of COLING 2012, Posters, Mumbai, Dec. 2012, pp. 1249-1260.

Yuan, Michael J., "Watson and healthcare", IBM Corporation, IBM developerWorks, http://www.ibm.com/developerworks/industry/library/ind-watson, Apr. 12, 2011, 11 pages.

Zeman, Daniel et al., "Improving Parsing Accuracy by Combining Diverse Dependency Parsers", Proceedings of the Ninth International Workshop on Parsing Technologies (IWPT), Vancouver, Oct. 2005, pp. 171-178.

Zhang, Hui et al., "K-Best Combination of Syntactic Parsers", Proceedings of the 2009 Conference on Empirical Methods in Natural Language Processing, Singapore, Aug. 6-7, 2009, pp. 1552-1560.

* cited by examiner

OPTIMIZING PARSING OUTCOMES OF DOCUMENTS

BACKGROUND

The present application relates generally to an improved data processing apparatus and method and more specifically to mechanisms for optimizing parsing outcomes of documents.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems that take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract an answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for optimizing parsing of grammatical prose in a multi-prose electronic document. The illustrative embodiment receives the multi-prose electronic document. The illustrative embodiment partitions the multi-prose electronic document into a set of text segments of homogenous prose. The illustrative embodiment executes a set of predefined Natural Language (NL) parsers on each text segment in the set of text segments in order to discern and measure a quality of parses by each of the set of predefined NL parsers throughout the electronic document. The illustrative embodiment performs a cross-parse analysis of the multi-prose electronic document leveraging a set of data points from the multi-prose electronic document. The illustrative embodiment performs an aggregation of adjacent clauses or sentences of poor quality parses. For each text segment in the set of text segments within the multi-prose electronic document, the illustrative embodiment identifies aggregation patterns yielding a best semantic role match from one of the set of predefined NL parsers. The illustrative embodiment generates a parsed electronic document using the set of predefined NL parsers such that, for each text segment in the set of text segments, the text segment is parsed by a NL parser in the set of NL parsers that has the best semantic role match to that text segment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions that, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As will be discussed in greater detail hereafter, the illustrative embodiments may be integrated in, and may augment and extend the functionality of, analysis systems with regard to optimizing parsing outcomes of documents comprised of heterogeneous prose, that is, documents written in the varying ordinary languages people use. Currently, real-world text may pose a challenge to achieving good-quality parses. In addition to oftentimes being grammatically incorrect and generated via an array of technologies such as Optical Character Recognition (OCR), speech-to-text, or the like, real-world documents are frequently aggregations of text from a variety of sources. Therefore, as analysis systems ingest and/or process text from an increasing variety of sources, utilizing a single one-size-fits-all parsing mechanism is inadequate. Thus, the present invention provides a parsing analysis mechanism to improve on the ability of analysis systems to parse text of varying grammatical prose.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
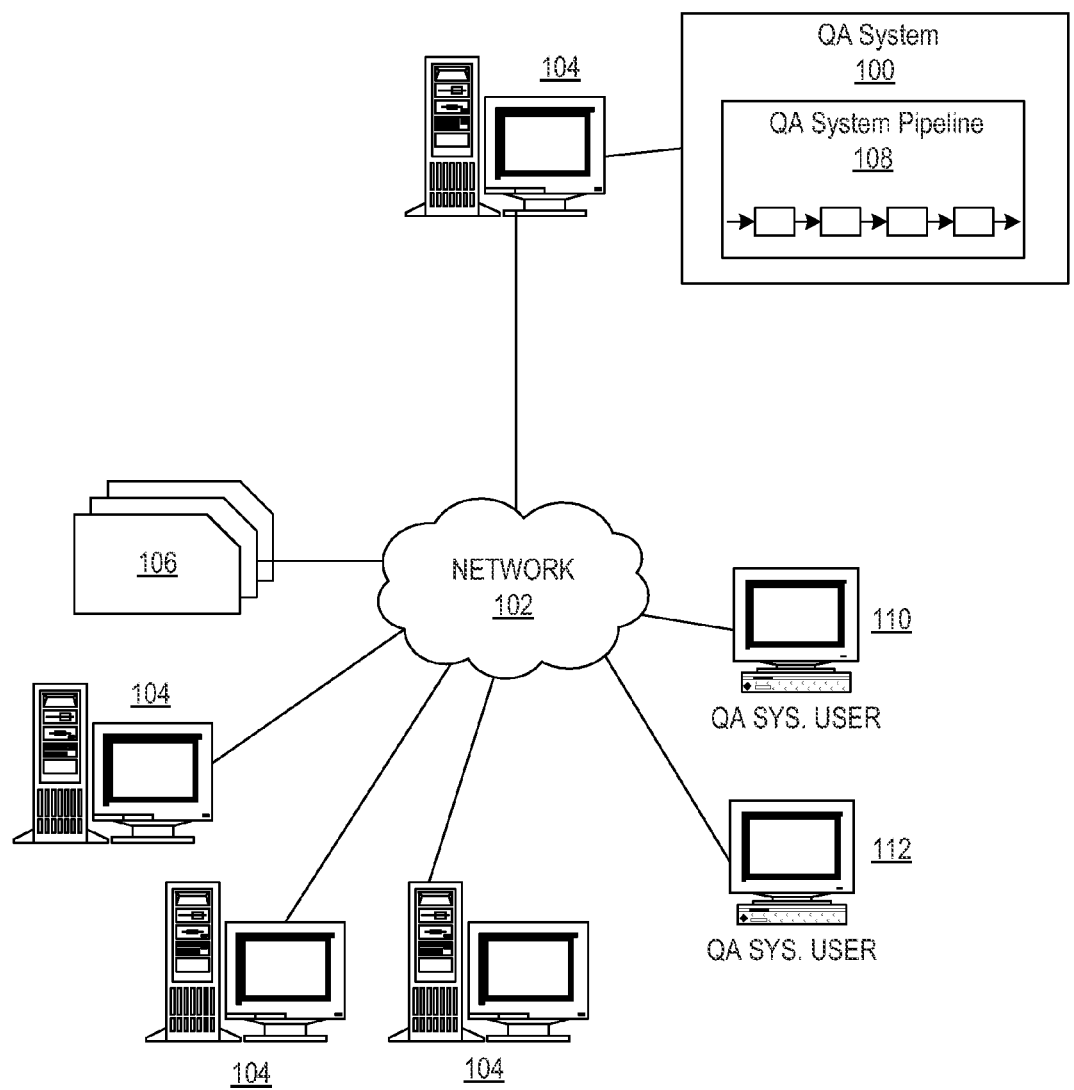
FIG. 1 depicts a schematic diagram of one illustrative embodiment of a question/answer creation (QA) system in a computer network.
Figure 2:
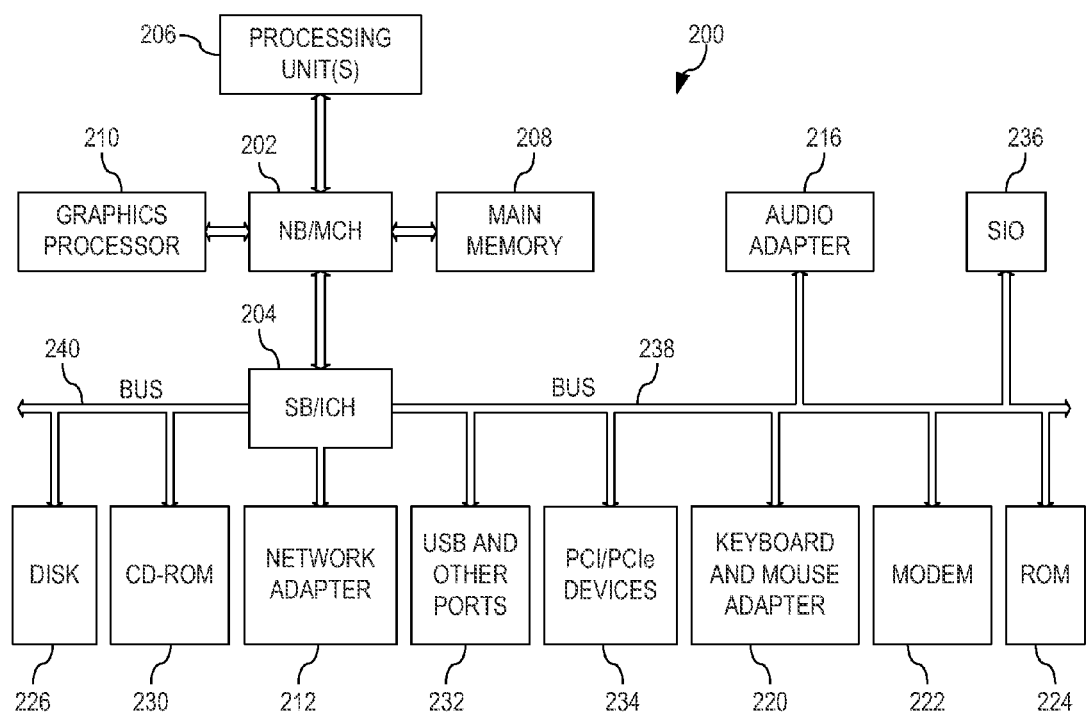
FIG. 2 is a block diagram of an example data processing system in which aspects of the illustrative embodiments may be implemented.
Figure 3:
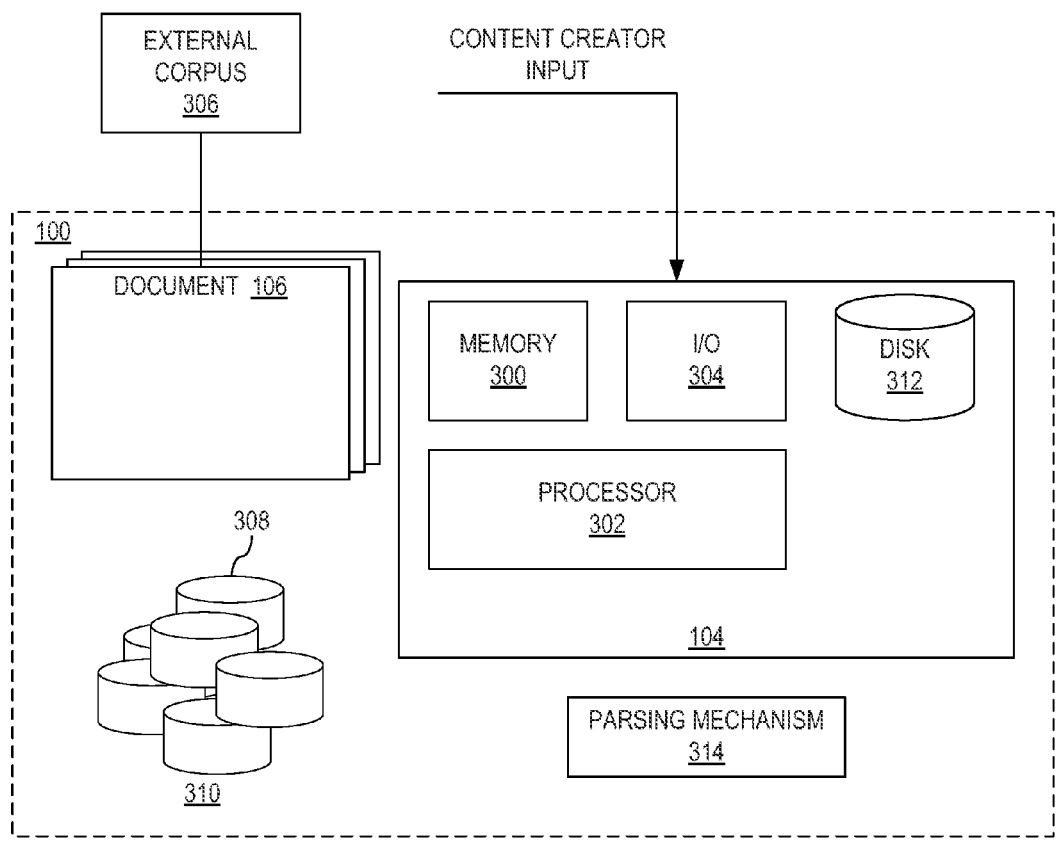
FIG. 3 depicts a schematic diagram of one embodiment of the QA system of FIG. 1 in accordance with one illustrative embodiment.

While the illustrative embodiments are not limited to such, and any analysis system may be used including other types of natural language processing (NLP) systems, the QA system is used herein as an example implementation of an illustrative embodiment. FIGS. 1-3 are directed to describing an example Question/Answer, Question and Answer, or Question Answering (QA) system, methodology, and computer program product with which the mechanisms of the illustrative embodiments may be implemented.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, and document database creators, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms that evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of electronic documents 106 (which is shown as a separate entity in FIG. 1 for illustrative purposes only). Portions of the corpus of electronic documents 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of electronic documents 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of electronic documents 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of electronic documents 106, and generating answers for the input question based on the processing of the corpus of electronic documents 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer System p POWER8 computer system, running the Advanced Interactive Executive (AIX) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 4:
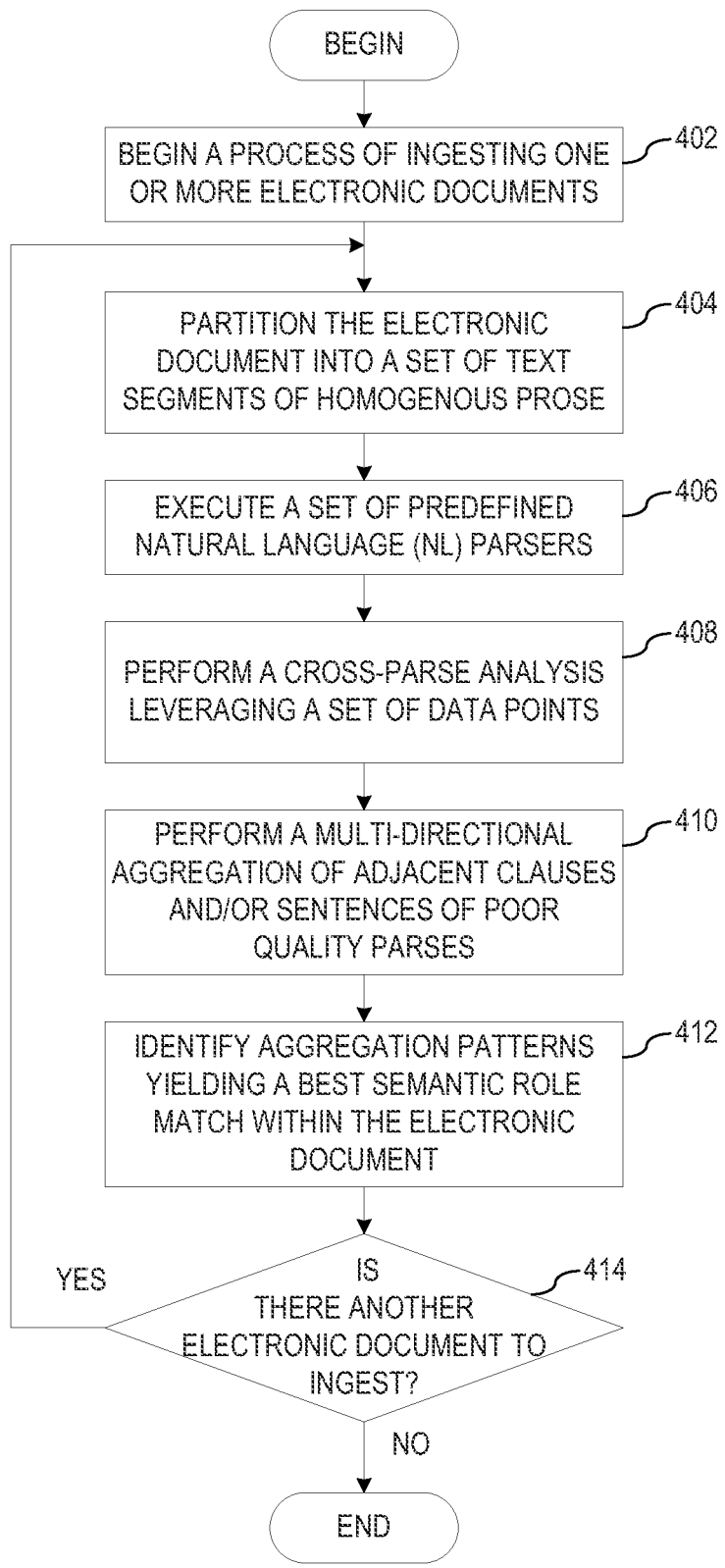
FIG. 4 depicts an exemplary flowchart of the operation performed by a parsing mechanism in optimizing parsing outcomes of documents in accordance with an illustrative embodiment.

FIG. 3 depicts a schematic diagram of one embodiment of QA system 100 of FIG. 1 in accordance with an illustrative embodiment. The depicted QA system 100 includes various components, described in more detail below, that are capable of performing the functions and operations described herein. In one embodiment, at least some of the components of QA system 100 are implemented in a computer system. For example, the functionality of one or more components of QA system 100 may be implemented by computer program instructions stored on computer memory device 300 and executed by a processing device, such as processor 302. QA system 100 may include other components, such as input/output devices 304 and at least one electronic document 106 from external corpus 306, which may be stored in internal corpus 308 within corpora 310 of QA system 100. Some or all of the components of QA system 100 may be stored on a single computing device 104 or on a network of computing devices 104, including a wireless communication network. QA system 100 may include more or fewer components or subsystems than those depicted herein. In some embodiments, QA system 100 may be used to implement the methods described herein as depicted in FIG. 4 and may be augmented or configured to implement the additional operations, functionality, and features described hereafter with regard to the illustrative embodiments described in conjunction with the subsequent figures.

In one embodiment, QA system 100 includes at least one computing device 104 with processor 302 for performing the operations described herein in conjunction with QA system 100. Processor 302 may include a single processing device or multiple processing devices. Processor 302 may have multiple processing devices in different computing devices 104 over a network such that the operations described herein may be performed by one or more computing devices 104. Processor 302 is connected to and in communication with the memory device. In some embodiments, processor 302 may store and access data on memory device 300 for performing the operations described herein. Processor 302 may also be connected to disk 312, which may be used for data storage, for example, for storing data from memory device 300, data used in the operations performed by processor 302, and software for performing the operations described herein.

In one embodiment, QA system 100 ingests and/or processes electronic documents 106. Electronic documents 106 may be part of a larger external corpus 306 of data or content, which may contain electronic documents 106 related to a specific topic or a variety of topics. Further, each of the one or more electronic documents 106 comprises one or more prose. That is, each of the one or more electronic documents 106 comprises one or more forms of language grammatical structure and natural flow of speech. Those electronic documents 106 that comprise more than one prose are considered to be multi-prose electronic documents. The following is an example of a document that may be comprised within external corpus 306.

> This letter is regarding my patient Ms. Patient. Ms. Patient has had a history of chronic nasal obstruction that has been refractory to nasal steroid sprays, antihistamines, and Singular. She has a history of multiple traumas to her nose as a teenager.
> On examination, she has broad deviation of her nasal skeleton rightward. Endonasally, she has convolution of her nasal septum causing 90% obstruction on the left side due to a large spur along the perpendicular plane of the vomer, as well as posterior deviation on the right side causing 50% obstruction. She also has bilateral inferior turbinate hypertrophy.
> She would benefit from functional nasal reconstruction through an open approach with bilateral medial and lateral osteotomies and major septal repair to straighten the nasal pyramid. She also has bilateral concha bullosa which would require marsupialization. Thank you for your assistance in this matter.

External corpus 306 of data may include any number of electronic documents 106, such as the example provided, and may be stored in any location relative to QA system 100. Processor 302 of QA system 100 may be capable of ingesting and/or processing any of electronic documents 106 in external corpus 306 of data. Processor 302 may communicate with memory device 300 or disk 312 to store data while external corpus 306 is being processed.

As processor 302 ingests and/or processes each of electronic documents 106, parsing mechanism 314, executed by processor 302, logically partitions each of electronic documents 106 into a set of text segments of homogenous prose, where, in accordance with the illustrative embodiments, each text segment may comprise a word, a clause, a sentence, or the like. For example, using the above exemplary document, if the segmentation rules are to break on period and not on carriage return, then parsing mechanism 314 would produce the following:

(S1) This letter is regarding my patient Ms.
(S2) Patient.
(S3) Ms.
(S4) Patient has had a history of chronic nasal obstruction that has been refractory to nasal steroid sprays, antihistamines, and Singular.
(S5) She has a history of multiple traumas to her nose as a teenager.
(S6) On examination, she has broad deviation of her nasal skeleton rightward.
(S7) Endonasally, she has convolution of her nasal septum causing 90% obstruction on the left side due to a large spur along the perpendicular plane of the vomer, as well as posterior deviation on the right side causing 50% obstruction.
(S8) She also has bilateral inferior turbinate hypertrophy.
(S9) She would benefit from functional nasal reconstruction through an open approach with bilateral medial and lateral osteotomies and major septal repair to straighten the nasal pyramid.
(S10) She also has bilateral concha bullosa which would require marsupialization.
(S11) Thank you for your assistance in this matter.

As another example, using the above exemplary document, if the segmentation rules are to break on period and on carriage return, then parsing mechanism 314 would produce the following segments (S):

(S1) This letter is regarding my patient Ms.
(S2) Patient.
(S3) Ms.
(S4) Patient has
(S5) had a history of chronic nasal obstruction that has been refractory to
(S6) nasal steroid sprays, antihistamines, and Singular.
(S7) She has a history of
(S8) multiple traumas to her nose as a teenager.
(S9) On examination, she has broad deviation of her nasal skeleton
(S10) rightward.
(S11) Endonasally, she has convolution of her nasal septum
(S12) causing 90% obstruction on the left side due to a large spur along the
(S13) perpendicular plane of the vomer, as well as posterior deviation on the
(S14) right side causing 50% obstruction.
(S15) She also has bilateral inferior
(S16) turbinate hypertrophy.
(S17) She would benefit from functional nasal reconstruction through
(S18) an open approach with bilateral medial and lateral osteotomies and
(S19) major septal repair to straighten the nasal pyramid.
(S20) She also has
(S21) bilateral concha bullosa which would require marsupialization.
(S22) Thank
(S23) you for your assistance in this matter.

As still another example, using the above exemplary document, if the segmentation rules are to break on start of sentence upper casing and on end of sentence punctuation, then parsing mechanism 314 would produce the following:

(S1) This letter is regarding my patient Ms. Patient.
(S2) Ms. Patient has had a history of chronic nasal obstruction that has been refractory to nasal steroid sprays, antihistamines, and Singular.
(S3) She has a history of multiple traumas to her nose as a teenager.
(S4) On examination, she has broad deviation of her nasal skeleton rightward.
(S5) Endonasally, she has convolution of her nasal septum causing 90% obstruction on the left side due to a large spur along the perpendicular plane of the vomer, as well as posterior deviation on the right side causing 50% obstruction.
(S6) She also has bilateral inferior turbinate hypertrophy.
(S7) She would benefit from functional nasal reconstruction through an open approach with bilateral medial and lateral osteotomies and major septal repair to straighten the nasal pyramid.
(S8) She also has bilateral concha bullosa which would require marsupialization.
(S9) Thank you for your assistance in this matter.

Thus, in a multi-prose document, parsing mechanism 314 identifies a beginning and end of a plurality of prose deltas and logically segments the text in each prose delta via prescribed prose metrics, as illustrated in the examples above. The standard prose metrics comprising one or more of character casings, such as upper case or lower case; number of words between punctuation or any character/symbol, such as number of words between periods, number of words between carriage returns, paragraph returns, or line feeds; or number of characters between symbols carriage returns, paragraph returns, or line feeds. Parsing mechanism 314 may also generalize to include similar density metrics for any domain relevant entities that may be provided by a given set of analytics.

Once parsing mechanism 314 has identified the plurality of prose deltas and set of text segments in each prose delta, parsing mechanism 314 executes a set of predefined Natural Language (NL) parsers, such as e.g. IBM's XSG, Stanford Parser, or the like, on each text segment in the set of text segments. Parsing mechanism 314 executes a set of predefined Natural Language (NL) parsers on each text segment in the set of text segments in order to discern and measure a quality of parses by each of the set of predefined NL parsers throughout electronic document 106. The quality of a parse by an individual NL parser may me identified through many different measurements, such as through a parse score indicating a confidence of a score, identified by the parser itself; a probability of a term's semantic role from the parse to the term's role elsewhere in the document and external data (corpus); a presence or an absence of concept annotations derived from the parse; or the like. Additionally, a quality of a parse by an individual NL parser may be determined by leveraging a degree of harmony or discord between disparate parser results. Still further, probabilities from machine learning models associated with each individual NL parser may be leveraged as yet another data point on the quality of the parse by an individual NL parser. Depending on the embodiment, parsing mechanism 314 may select and execute all NL parsers from a set of predefined NL parsers or a subset of the set of predefined NL parsers based on, initially, general applicability, random selection, or the like, or, as will be described hereafter, based on previously gathered metrics identifying a best matching prose-to-parser that is identified using machine learning.

With regard to identifying a best matching prose-to-parser, parsing mechanism 314 evaluates all the parses within the different sections of homogenous prose within the document and chooses the parses and sub-elements of the parses that yield the best overall results from the individual parses performed by the set of predefined NL parsers. That is, parsing mechanism 314 performs a cross-parse analysis leveraging a set of data points from both electronic document 106 and, if necessary, external data in external corpus 306, such that, for each homogeneous prose, the parse from an individual NL parser with the highest parsing quality for the homogeneous prose is identified. Thus, the cross parse analysis identified the degree of harmony or discord between disparate parser results of the set of predefined NL parsers to identify the parse from an individual NL parser with the highest parsing quality. For instance, if multiple NL parsers achieve a good parse score for a given sentence/clause and the parse scores are consistent, parsing mechanism 314 concludes that the parse is good, resulting a negligible decision as to which NL parser to use for the particular given sentence and semantic roles, parts of speech, and the like. However, if multiple NL parsers are achieving varying quality of parse scores, parsing mechanism 314 then identifies which parse or sub-elements therein are best for the particular given sentence/clause. When multiple NL parsers result in varying quality of parses over a the particular given sentence/clause, parsing mechanism 314 identifies, for example, the parse elements that yield consistent semantic roles for key parts of speech (e.g. noun phrases) between the particular sentence/clause in question and the corpora from which the semantic roles within the context in which it appears for a given solution domain are statistically tracked. By measuring semantic roles between a sentence/clause and a corpora, parsing mechanism 314 determines a statistical probability as to which parse is probable to be the best and thus, which NL parser is best for the particular given sentence/clause.

Therefore, parsing mechanism 314 cross-analyzes each parser's results using a plurality of data points, including but not limited to: a degree of harmony/discord between disparate parser results, probability of a term's semantic role and shifts therein in relation to its role elsewhere in electronic document 106 and, potentially, external data in external corpus 306, or the like. Further, parsing mechanism 314 performs a multi-directional aggregation of adjacent clauses and/or sentences of poor quality parses in multiple directions, such as left to right, right to left, left-right-left, or the like, to achieve the best possible parses within the document. For example, if multiple NL parsers are achieving varying quality of parse scores with inconsistent semantic roles from similar context within the corpora, parsing mechanism 314 aggregates adjacent clauses in varying directions in an attempt to achieve the best collective parses in which the semantic roles achieve consistency with the corpora. Thus, parsing mechanism 314 adjusts the parses to achieve semantic role consistency of key terms (noun phrases) with terms in the corpora appearing in similar contexts. By parsing mechanism 314 performing multi-directional aggregation of adjacent clauses and/or sentences of poor quality parses in multiple directions, parsing mechanism 314 identifies a statistical methodology of evaluating parses from a corpora that may be expanded and curated to serve as a ground truth for semantic roles for documents within a given domain. By performing the multi-directional aggregation, parsing mechanism 314 measures the probability of each term's semantic roles against the immediate context within electronic document 106, the overall of electronic document 106, as well as, potentially, additional external data in external corpus 306.

With the cross analysis of each parser's results and the probability of each term's semantic roles, for each text segment in the set of text segments within electronic document 106, parsing mechanism 314 identifies aggregation patterns yielding a best semantic role match from one of the set of predefined NL parsers. Aggregation patterns may be either learned over time, by gathering metrics on the patterns that statistically yield the best parses as previously described, or from up-front machine learning techniques employed to the same affect. Absent an NL model or previously gathered statistics, the aggregation pattern may be either configured (if there's a known heuristic for a given domain) or random, with the expectation that patterns will emerge over time. Parsing mechanism 314 tracks these results and the semantic role shifts through multiple paths of multi-direction aggregation in order to map out the best possible aggregation path and identify the best matching prose-to-parser for each identified type of prose. The results may be tracked base on the particular environment in which the parsing is being performed. For example, in an Unstructured Information Management Architecture (UIMA) environment, the results data structure would be annotations within a content-addressable storage (CAS) file. Parses themselves and sub-elements therein are annotations within the CAS file and parsing mechanism 314 coaxes parses to achieve varying results for poor parses and/or combines sub-elements of multiple parses to create a new set of parse annotations within the CAS file.

Therefore, when a particular type of prose is encountered in ingesting and/or processing another document in electronic documents 106, parsing mechanism 314 may select and execute a NL parser based on previously gathered metrics identifying a best matching prose-to-parser that is identified using machine learning. Thus, when a parsed electronic document is requested, parsing mechanism 314 generates a parsed electronic document using the set of predefined NL parsers such that, for each text segment in the set of text segments, the text segment is parsed by a NL parser in the set of NL parsers that has the best semantic role match to that text segment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 4 depicts an exemplary flowchart of the operation performed by a parsing mechanism in optimizing parsing outcomes of documents in accordance with an illustrative embodiment. As the operation begins, a processor begins a process of ingesting one or more electronic documents (step 402). In accordance with the illustrative embodiments, each of the one or more electronic documents comprises one or more prose, i.e. one or more forms of language grammatical structure and natural flow of speech, and, as such, those electronic documents that comprise more than one prose are considered to be multi-prose electronic documents. As the processor ingests each electronic document of the one or more electronic documents, the parsing mechanism, executed by the processor, logically partitions the electronic document into a set of text segments of homogenous prose (step 404). That is, the parsing mechanism identifies a beginning and end of a plurality of prose deltas and logically segments the text in each prose delta via standard prose metrics. The standard prose metrics comprising one or more of character casings, number of words between punctuation or any character/symbol, such as number of words between periods, number of words between carriage returns, paragraph returns, line feeds, or the like, number of characters between symbols carriage returns, paragraph returns, line feeds, or the like. The parsing mechanism may also generalize to include similar density metrics for any domain relevant entities that may be provided by a given set of analytics.

Once the parsing mechanism has identified the plurality of prose deltas and the set of text segments the text in each prose delta, the parsing mechanism executes a set of predefined Natural Language (NL) parsers in order to discern and measure a quality of parses by each of the set of predefined NL parsers throughout the electronic document (step 406). Depending on the embodiment, the parsing mechanism may select and execute all NL parsers from a set of predefined NL parsers or a subset of the set of predefined NL parsers based on, initially, general applicability, random selection, or the like, or, as will be described hereafter, based on previously gathered metrics identifying a best matching prose-to-parser that is identified using machine learning.

With regard to identifying a best matching prose-to-parser, a parsing mechanism performs a cross-parse analysis leveraging a set of data points from both the electronic document and, if necessary, external data in an external corpus (step 408). That is, a parsing mechanism cross-analyzes each parser's results using a plurality of data points, including but not limited to: a degree of harmony/discord between disparate parser results, probability of a term's semantic role and shifts therein in relation to its role elsewhere in the electronic document and, potentially, external data in the external corpus, or the like.

Further, the parsing mechanism performs a multi-directional aggregation of adjacent clauses and/or sentences of poor quality parses in multiple directions (step 410), such as left to right, right to left, left-right-left, or the like, to achieve the best possible parses within the document. By performing the multi-directional aggregation, the parsing mechanism measures the probability of each term's semantic roles against the immediate context within electronic document, the overall of electronic document, as well as, potentially, additional external data in the external corpus.

With the cross analysis of each parser's results and the probability of each term's semantic roles, for each text segment in the set of text segments within the electronic document, the parsing mechanism identifies aggregation patterns yielding a best semantic role match from one of the set of predefined NL parsers (step 412). The parsing mechanism tracks these results and the semantic role shifts through multiple paths of multi-direction aggregation in order to map out the best possible aggregation path and identify the best matching prose-to-parser for each identified type of prose. Therefore, when a particular type of prose is encountered in ingesting and/or processing another electronic document in electronic documents, the parsing mechanism may select and execute a NL parser based on previously gathered metrics identifying a best matching prose-to-parser that is identified using machine learning. Thus, when a parsed electronic document is requested, the parsing mechanism generates a parsed electronic document using the set of predefined NL parsers such that, for each text segment in the set of text segments, the text segment is parsed by a NL parser in the set of NL parsers that has the best semantic role match to that text segment. From step 412, the processor determines if there is another electronic document to ingest (step 414). If at step 414 there is another electronic document, then the operation returns to step 404. If at step 414 there is not another electronic document, then the operation ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for optimizing parsing outcomes of documents. In order to address the current one-size-fits-all parsing of electronic documents, the mechanisms of the present invention partition a multi-prose electronic document into a set of text segments of homogenous prose and executes a set of predefined Natural Language (NL) parsers on each text segment in the set of text segments order to discern and measure a quality of parses by each of the set of predefined NL parsers throughout the electronic document. The mechanisms then perform a cross-parse analysis of the multi-prose electronic document leveraging a set of data points from the multi-prose electronic document and an aggregation of adjacent clauses or sentences of poor quality parses in order to, for each text segment in the set of text segments within the multi-prose electronic document, identify aggregation patterns yielding a best semantic role match from one of the set of predefined NL parsers. Thus, when a parsed electronic document is requested, the mechanisms generate a parsed electronic document using the set of predefined NL parsers such that, for each text segment in the set of text segments, the text segment is parsed by a NL parser in the set of NL parsers that has the best semantic role match to that text segment.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing parsing of grammatical prose in a multi-prose electronic document, the method comprising:

receiving, by a processor in the data processing system, the multi-prose electronic document, the multi-prose electronic document comprising at least two forms of language structure and natural flow of speech, wherein the processor is a hardware processor;

partitioning, by the processor, the multi-prose electronic document into sets of text segments of homogenous prose, each set of text segments of homogenous prose being of a different homogenous prose from the other sets of text segments of homogenous prose;

executing, by the processor, a set of predefined Natural Language (NL) parsers on each text segment in each of the sets of text segments of homogenous prose in order to discern and measure a quality of parses by each of the set of predefined NL parsers throughout the multi-prose electronic document, wherein the set of predefined NL parsers is a subset of the set of predefined NL parsers selected based on previously gathered metrics identifying a best matching prose-to-parser that is identified using machine learning;

performing, by the processor, a cross-parse analysis of the multi-prose electronic document leveraging a set of data points from the multi-prose electronic document to identify the parse from an individual NL parser with the highest parsing quality;

for each parse of poor quality by multiple NL parsers of the set of predefined NL parsers, the parse of poor quality being identified by parse results of the multiple NL parses varying in quality, performing, by the processor, an aggregation of adjacent clauses or sentences to the parse of poor quality to identify a parse of the parse of poor quality with the aggregated adjacent clauses or sentences from an individual NL parser with the highest parsing quality;

for each text segment in each of the sets of text segments of homogenous prose within the multi-prose electronic document, identifying, by the processor, aggregation patterns yielding a best semantic role match from one of the set of predefined NL parsers, wherein the aggregation patterns yielding the best sematic role match is based on the identified individual NL parser with the highest parsing quality for that text segment; and generating, by the processor, a parsed electronic document using the set of predefined NL parsers such that, for each text segment in each of the sets of text segments of homogenous prose, the text segment is parsed by a NL parser in the set of predefined NL parsers that has the best semantic role match to that text segment.

2. The method of claim 1, wherein partitioning the multi-prose electronic document into the segments of homogenous prose comprises:

identifying, by the processor, a beginning and an end of a plurality of prose deltas; and logically segmenting, by the processor, text in each prose delta of the plurality of prose delta via standard prose metrics.

3. The method of claim 2, wherein the standard prose metrics comprise at least one of one or more of character casings, number of words between punctuation, number of words between a set of specified characters, number of words between a set of symbols, number of characters between punctuation, number of characters between a set of symbols, number of words between carriage returns, number of words between paragraph returns, number of characters between carriage returns, or number of characters between paragraph returns.

4. The method of claim 1, wherein performing the cross-parse analysis of the multi-prose electronic document leveraging the set of data points from the multi-prose electronic document further utilizes data points from an external corpus.

5. The method of claim 1, wherein the plurality of data points comprises a degree of harmony/discord between disparate parser results, probability of a term's semantic role and shifts therein in relation to its role elsewhere in the electronic document, or external data in an external corpus.

6. The method of claim 1, wherein performing the aggregation of adjacent clauses or sentences of poor quality parses is performed in multiple directions and wherein the multiple directions comprise at least one of left to right, right to left, left-right-left, or right-left-right, in order to achieve the best possible parses within the multi-prose electronic document.

7. The method of claim 1, further comprising:

measuring, by the processor, a probability of each term's semantic role in the adjacent clauses or sentences against immediate context within electronic document, the overall of electronic document; and identifying, by the processor, the aggregation patterns yielding the best semantic role match within the multi-prose electronic document utilizing the probability of each term's semantic role.

8. A computer program product comprising a non-transitory computer readable storage medium having a computer readable program stored therein, wherein the computer readable program, when executed on a computing device, causes the computing device to:

receive a multi-prose electronic document, the multi-prose electronic document comprising at least two forms of language structure and natural flow of speech;

partition the multi-prose electronic document into sets of text segments of homogenous prose, each set of text segments of homogenous prose being of a different homogenous prose from the other sets of text segments of homogenous prose;

execute a set of predefined Natural Language (NL) parsers on each text segment in each of the sets of text segments of homogenous prose in order to discern and measure a quality of parses by each of the set of predefined NL parsers throughout the multi-prose electronic document, wherein the set of predefined NL parsers is a subset of the set of predefined NL parsers selected based on previously gathered metrics identifying a best matching prose-to-parser that is identified using machine learning;

perform a cross-parse analysis of the multi-prose electronic document leveraging a set of data points from the multi-prose electronic document to identify the parse from an individual NL parser with the highest parsing quality;

for each parse of poor quality by multiple NL parsers of the set of predefined NL parsers, the parse of poor quality being identified by parse results of the multiple NL parses varying in quality, perform an aggregation of adjacent clauses or sentences to the parse of poor quality to identify a parse of the parse of poor quality with the aggregated adjacent clauses or sentences from an individual NL parser with the highest parsing quality;

for each text segment in each of the sets of text segments of homogenous prose within the multi-prose electronic document, identify aggregation patterns yielding a best semantic role match from one of the set of predefined NL parsers, wherein the aggregation patterns yielding the best sematic role match is based on the identified individual NL parser with the highest parsing quality for that text segment; and generate a parsed electronic document using the set of predefined NL parsers such that, for each text segment in each of the sets of text segments of homogenous prose, the text segment is parsed by a NL parser in the set of predefined NL parsers that has the best semantic role match to that text segment.

9. The computer program product of claim 8, wherein the computer readable program to partition the multi-prose electronic document into the segments of homogenous prose further causes the computing device to:

identify a beginning and an end of a plurality of prose deltas; and logically segment text in each prose delta of the plurality of prose delta via standard prose metrics.

10. The computer program product of claim 9, wherein the standard prose metrics comprise at least one of one or more of character casings, number of words between punctuation, number of words between a set of specified characters, number of words between a set of symbols, number of characters between punctuation, number of characters between a set of symbols, number of words between carriage returns, number of words between paragraph returns, number of characters between carriage returns, or a number of characters between paragraph returns.

11. The computer program product of claim 8, wherein performing the cross-parse analysis of the multi-prose electronic document leveraging the set of data points from the multi-prose electronic document further utilizes data points from an external corpus.

12. The computer program product of claim 8, wherein the plurality of data points comprises a degree of harmony/discord between disparate parser results, probability of a term's semantic role and shifts therein in relation to its role elsewhere in the electronic document, or external data in an external corpus.

13. An apparatus comprising:

a processor; and a memory coupled to the processor, wherein the memory comprises instructions which, when executed by the processor, cause the processor to:

receive a multi-prose electronic document, the multi-prose electronic document comprising at least two forms of language structure and natural flow of speech;

partition the multi-prose electronic document into sets of text segments of homogenous prose, each set of text segments of homogenous prose being of a different homogenous prose from the other sets of text segments of homogenous prose;

execute a set of predefined Natural Language (NL) parsers on each text segment in each of the sets of text segments of homogenous prose in order to discern and measure a quality of parses by each of the set of predefined NL parsers throughout the multi-prose electronic document, wherein the set of predefined NL parsers is a subset of the set of predefined NL parsers selected based on previously gathered metrics identifying a best matching prose-to-parser that is identified using machine learning;

perform a cross-parse analysis of the multi-prose electronic document leveraging a set of data points from the multi-prose electronic document to identify the parse from an individual NL parser with the highest parsing quality;

for each parse of poor quality by multiple NL parsers of the set of predefined NL parsers, the parse of poor quality being identified by parse results of the multiple NL parses varying in quality, perform an aggregation of adjacent clauses or sentences to the parse of poor quality to identify a parse of the parse of poor quality with the aggregated adjacent clauses or sentences from an individual NL parser with the highest parsing quality;

for each text segment in each of the sets of text segments of homogenous prose within the multi-prose electronic document, identify aggregation patterns yielding a best semantic role match from one of the set of predefined NL parsers, wherein the aggregation patterns yielding the best sematic role match is based on the identified individual NL parser with the highest parsing quality for that text segment; and generate a parsed electronic document using the set of predefined NL parsers such that, for each text segment in each of the sets of text segments of homogenous prose, the text segment is parsed by a NL parser in the set of predefined NL parsers that has the best semantic role match to that text segment.

14. The apparatus of claim 13, wherein the instructions to partition the multi-prose electronic document into the segments of homogenous prose further cause the processor to:

identify a beginning and an end of a plurality of prose deltas; and logically segment text in each prose delta of the plurality of prose delta via standard prose metrics.

15. The apparatus of claim 14, wherein the standard prose metrics comprise at least one of one or more of character casings, number of words between punctuation, number of words between a set of specified characters, number of words between a set of symbols, number of characters between punctuation, number of characters between a set of symbols, number of words between carriage returns, number of words between carriage returns paragraph returns, number of characters between carriage returns, or number of characters between paragraph returns.

16. The apparatus of claim 13, wherein performing the cross-parse analysis of the multi-prose electronic document leveraging the set of data points from the multi-prose electronic document further utilizes data points from an external corpus.

17. The apparatus of claim 13, wherein the plurality of data points comprises a degree of harmony/discord between disparate parser results, probability of a term's semantic role and shifts therein in relation to its role elsewhere in the electronic document, or external data in an external corpus.

* * * * *